(12) United States Patent
Rice et al.

(10) Patent No.: US 6,268,871 B1
(45) Date of Patent: *Jul. 31, 2001

(54) GENERATING A CURVE FOR COMPUTER GRAPHICS THROUGH POINTS RESIDING ON UNDERLYING GEOMETRIES IN A THREE DIMENSIONAL SPACE

(75) Inventors: Richard E. Rice; Craig W. McPheeters, both of Seattle, WA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/853,042

(22) Filed: Apr. 30, 1997

(51) Int. Cl.[7] .................................................... G06T 11/20
(52) U.S. Cl. ................................................................ 345/442
(58) Field of Search ............................................. 345/442

(56) References Cited

U.S. PATENT DOCUMENTS

| | | | | |
|---|---|---|---|---|
| 5,608,856 | * | 3/1997 | McInally | 395/142 |
| 5,636,338 | * | 6/1997 | Moreton | 395/142 |
| 5,731,820 | * | 3/1998 | Broekhuijsen | 345/442 |
| 5,734,756 | * | 3/1998 | Sherman et al. | 382/259 |

OTHER PUBLICATIONS

Parametric Technology Corp., Pro/Designer User's Guide, http://www.me.fau.edu/computer/prohelp/proids/model: "About This Guide" at page /about.htm#1002253 and "Overview" at page /oview.htm#1005723; also "Customer Support" at http://www.ios.chalmers.se/data/da...ualer/proe/support/cs/designer.htm; all copyrighted in 1997.

Adobe Systems Inc., Adobe Illustrator 8.0 product information, at http://www.adobe.com/proindex/illustrator/main.html, copyright 1999.

James D. Foley et al., Computer Graphics Principles and Practice, Second Edition in C, Addison–Wesley Publishing Co., Reading, MA, 1997, Chapter 8, "Input Devices, Interaction Techniques and Interaction Tasks, " pp. 347–389.

James D. Foley et al., Computer Graphics Principles and Practice, Second Edition in C, Addison–Wesley Publishing Co., Reading, MA, 1997, Chapter 9, "Dialog Design, " pp. 391–433.

James D. Foley et al., Computer Graphics Principles and Practice, Second Edition in C, Addison–Wesley Publishing Co., Reading, MA, 1997, Chapter 11, "Representing Curves and Surfaces, " pp. 471–531.

John A. Gregory, "Geometric Continuity, " Mathematical Methods in Computer Aided Geometric Design, Academic Press, Boston, 1989, pp. 353–356 and 367–371.

* cited by examiner

*Primary Examiner*—Mark Zimmerman
*Assistant Examiner*—Mano Padmanabhan
(74) *Attorney, Agent, or Firm*—Staas & Halsey LLP

(57) ABSTRACT

A method of computer generation of a curve through points includes accepting positions of the points, accepting a geometric continuity condition for at least one of the points, constructing the curve through the points, the curve obeying the geometric continuity condition, and storing the constructed curve in a memory.

35 Claims, 16 Drawing Sheets

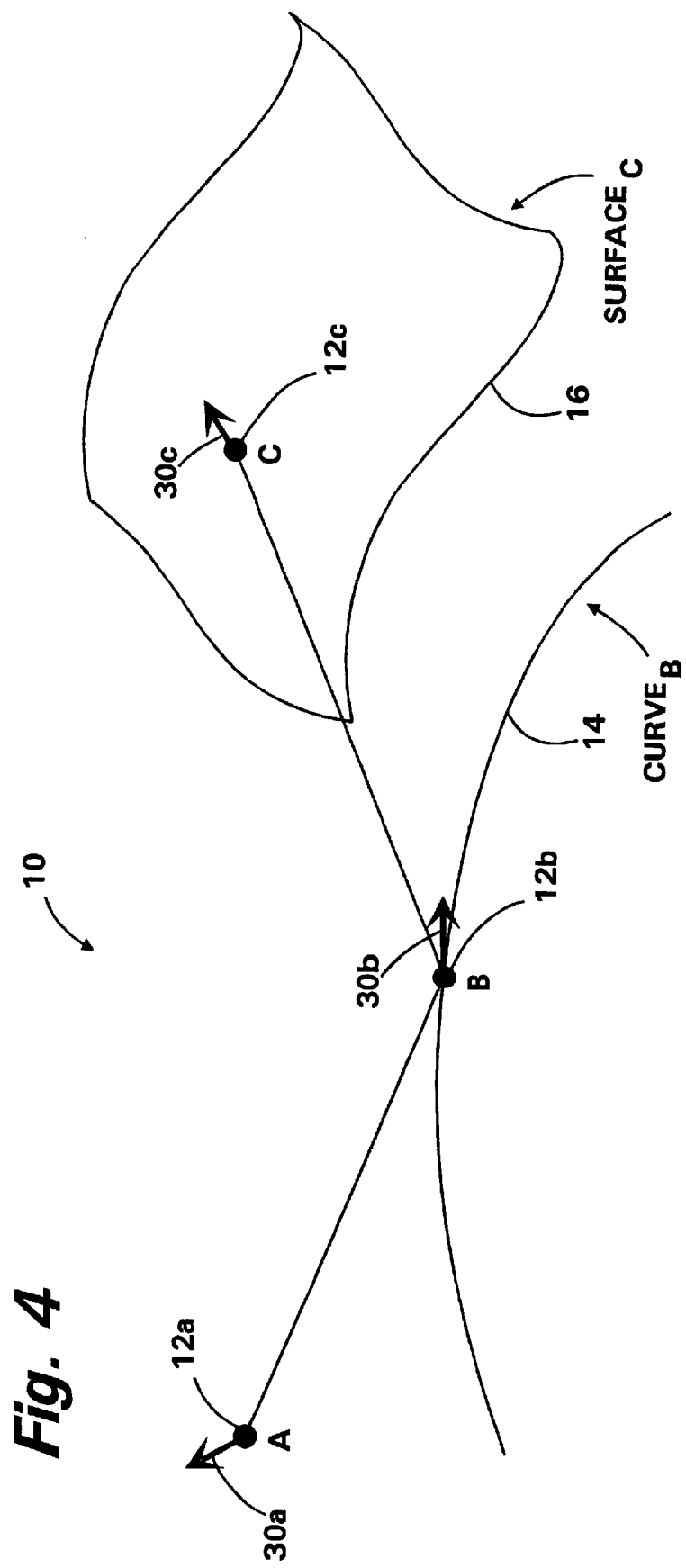

GENERATING A CURVE FOR COMPUTER GRAPHICS THROUGH POINTS RESIDING ON UNDERLYING GEOMETRIES IN A THREE DIMENSIONAL SPACE

This application includes a section of a user manual for Alias Auto Studio™ Version 8.0 entitled "Introduction to Blend Curves" (pages 45 to 72). The copyright owner has no objection to paper reproduction of the appendix as it appears in this patent document, or in the official files of the U.S. Patent & Trademark Office, but grants no other license and reserves all other rights whatsoever. The entire appendix is hereby incorporated by reference as if fully set forth herein.

BACKGROUND

This invention relates to curve generation for computer graphics.

Many computer applications generate or model curves. Computer aided design (CAD) systems, computer animation tools, and computer graphics applications all attempt to replicate smoothly curved real-world objects, or to generate new curved objects designed and developed with these tools. Many objects are not susceptible to exact mathematical description, and are often modeled interactively by a user employing artistic instead of scientific criteria. Computer systems require satisfactory methods of representing these objects and their edges and surfaces. Since computers have finite storage and processing capacity, an object cannot be modeled with an infinite number of coordinate points. Instead, object surfaces are approximated by segments such as curves, lines, planes, and other object "primitives" that are easier to describe mathematically.

Certain modeling methods use parametric polynomial curves to build up a model of an object. Typically, polynomial curve methods employ parametric equations based on cubic polynomial equations of a parameter (for a line segment, one parameter is used, e.g., "s"; for a surface, two parameters are used, e.g., "u" and "v"). A number of different polynomial forms for lines and surfaces have been developed, including Hermite, Bézier, and B-spline. Whatever parameter form is chosen, one or more curved lines or surfaces can be generated based upon a compact set of control points (or vertices) that unambiguously define the shape of those curves or surfaces. Parametric curves can be "re-parameterized" by a substitution of one ordered set of parameters for another in a one-for-one transformation, without changing the curve's appearance.

Often, a computer model of an object will require that several separately created curves match at their boundaries to create one seamless integrated object.

SUMMARY

In general, in one aspect, the invention features a method of computer generation of a curve through points including accepting positions of the points, accepting a geometric continuity condition for at least one of the points, constructing the curve through the points, the curve obeying the geometric continuity condition, and storing constructed curve in a memory.

Embodiments of the invention may include the following the features. The geometric continuity conditions may be at least $G^0$, $G^1$, or at least $G^2$. At least one of the points may be on a constraint curve, or on a constraint surface. The curve may be constructed using a least squares approximation. The least squares approximation may use control vertices of the constructed curve as variables. The least squares approximation may be an iterative series of least squares approximations, and each iterative least squares approximation may calculate a successively higher geometric continuity order for each of the points that requires the successively higher geometric continuity order. The method may include displaying the constructed curve.

In general, in another aspect, the invention features a method of computer generation of a curve through points including accepting positions of the points, accepting a geometric continuity condition for at least one of the points, constructing the curve through the points using a least squares approximation, wherein the least squares approximation uses control vertices of the constructed curve as variables, the curve obeying the geometric continuity condition, storing the constructed curve in a memory, and displaying the constructed curve.

In general, in another aspect, the invention features a computer program, residing on a computer-readable medium, comprising instructions for generating a curve through points by causing a computer to accept positions of the points, accept a geometric continuity condition for at least one of the points, construct the curve through the points, the curve obeying all accepted geometric continuity conditions, and store the constructed curve in a memory.

In general, in another aspect, the invention features a computer system for generating a curve through points including a central processing unit, a user input device for accepting positions of the points, and for accepting a geometric continuity condition for at least one of the points, a memory, a curve generation program stored in the memory, the curve generation program, when loaded and operated by the central processing unit, adapted to construct the curve through the points, the curve obeying the geometric continuity condition.

The advantages of the invention may include one or more of the following. A blended curve can be constructed that intersects constraint curves, surfaces, and clouds of points, and matches, to a defined order of geometric continuity, their curvature at the intersections. Such blended curves can exhibit a curve history, meaning that the blended curves remain attached to their constraint curves and surfaces even as those curves and surfaces are moved. Blended curves can be created and edited without placing control vertices: constraint points are simply placed anywhere the blended curve should pass through. An arbitrary number of constraint points can be selected, and each of these points can prescribe an arbitrary order of geometric continuity at that point. Very smooth blended curves can be constructed, which have desirable aesthetic properties, particularly by setting higher orders of geometric continuity where one curve must join another curve or surface.

Other features and advantages of the invention will become apparent from the following description and from the claims.

DRAWINGS

FIG. 4 is a perspective view of a blended curve configuration with superimposed direction requirements.

Figure 11:
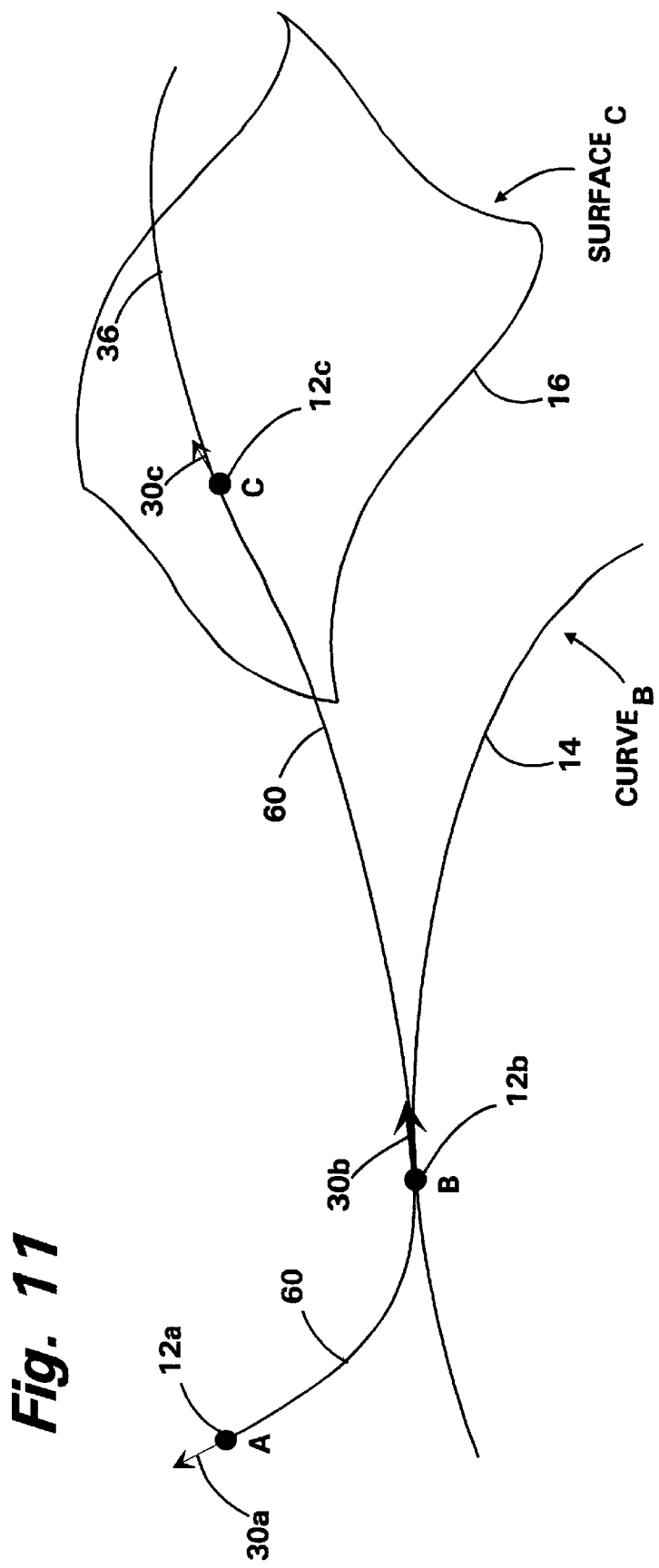
Figure 12:
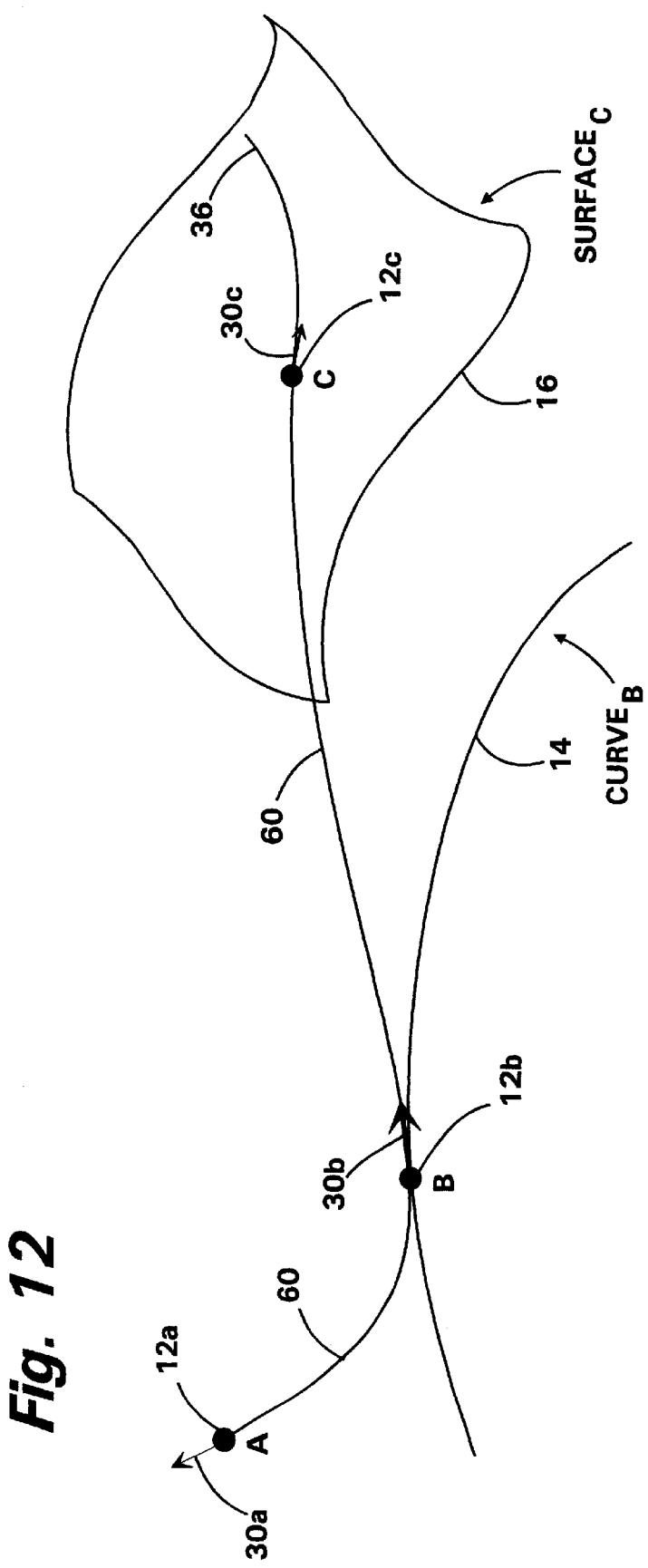
Figure 13:
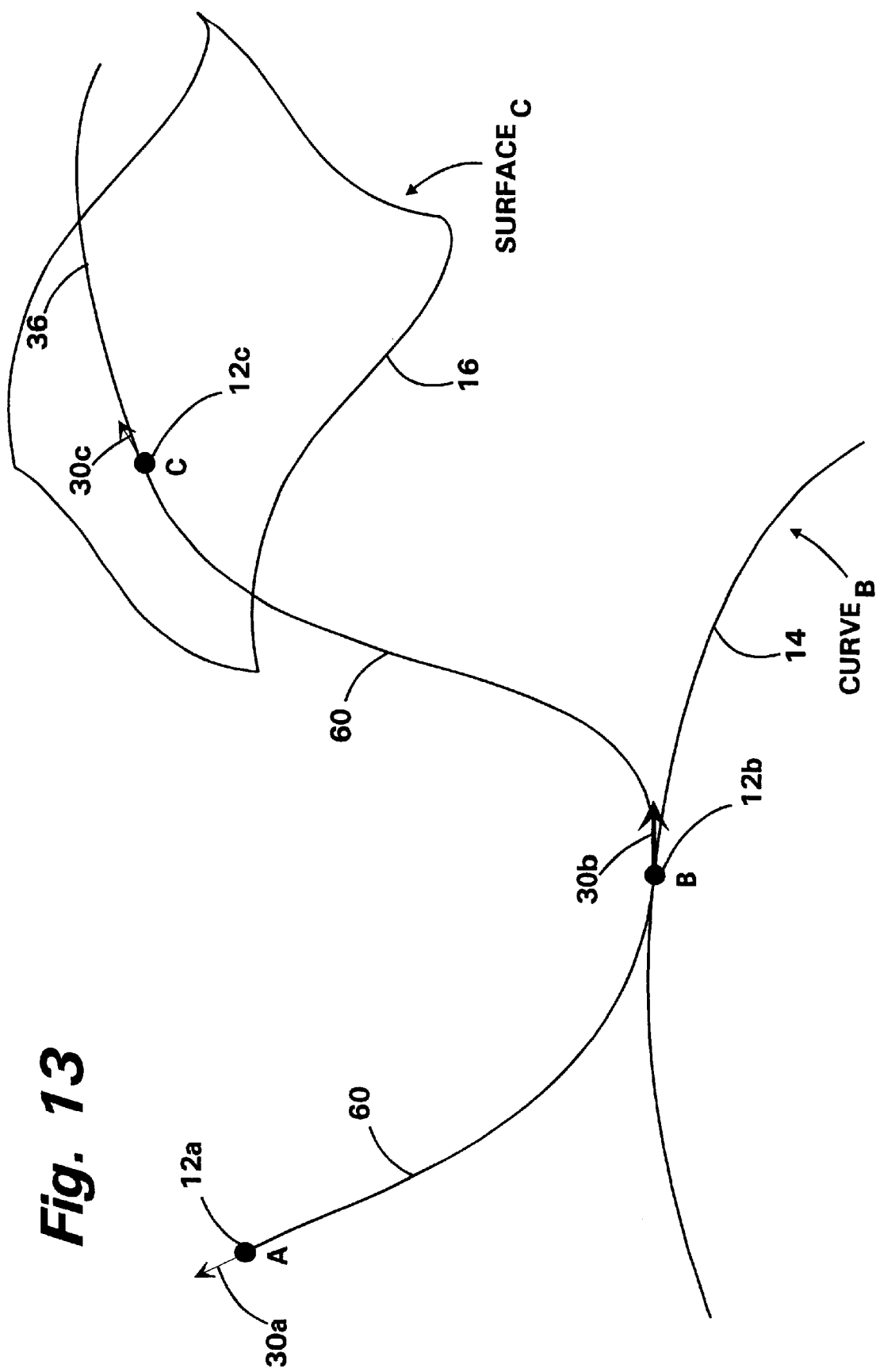

FIGS. 11, 12, and 13 are perspective views of a calculated blended curve with movement of constraint points, curves, and surfaces.

Figure 14:
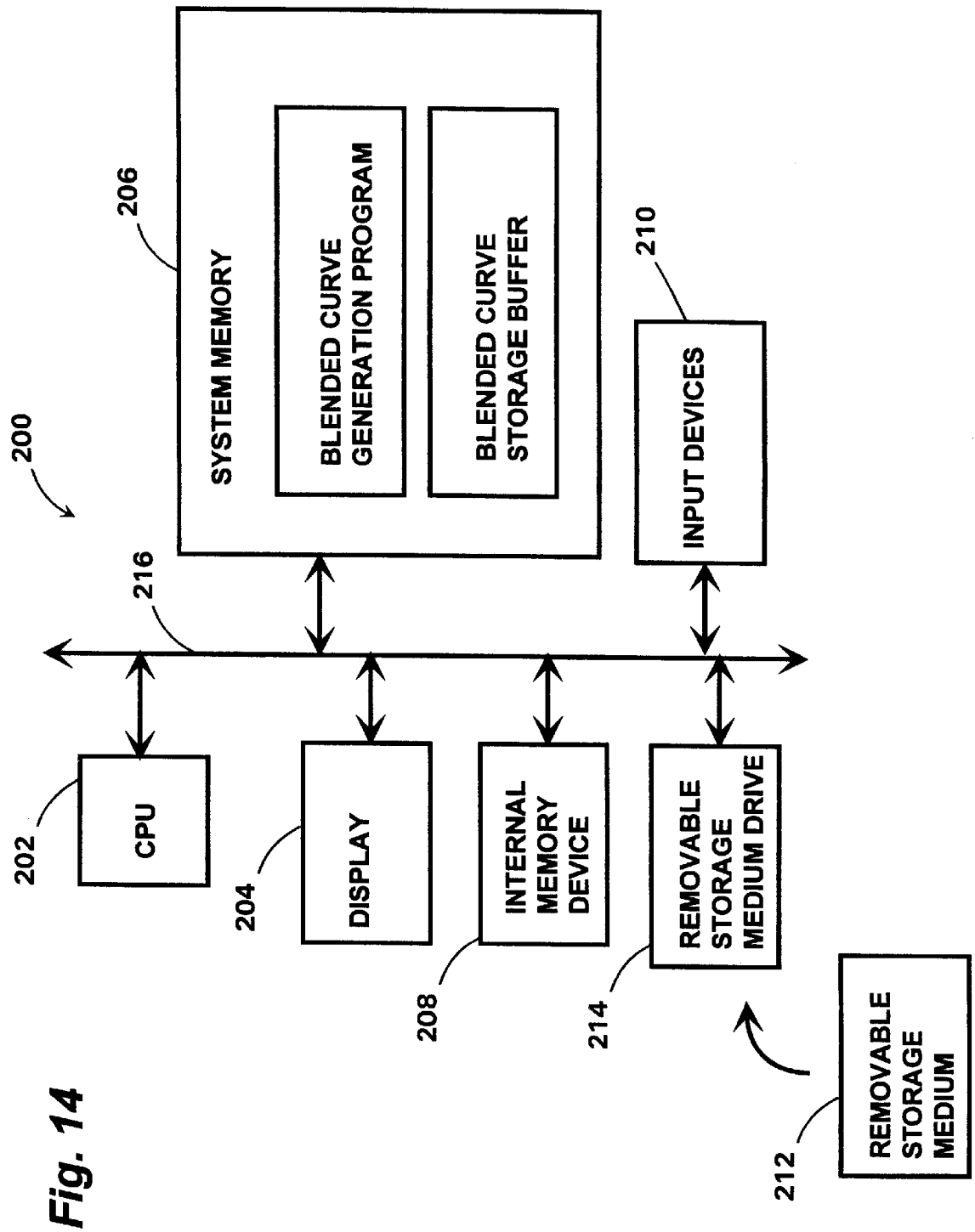

FIG. 14 is a schematic diagram of a computer system having a blended curve generation program.

Figure 15:
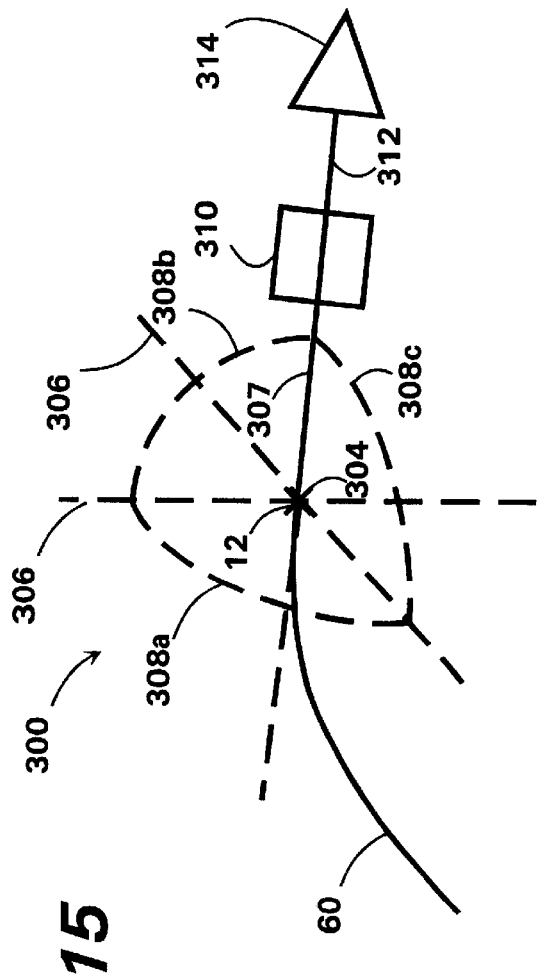
Figure 16:
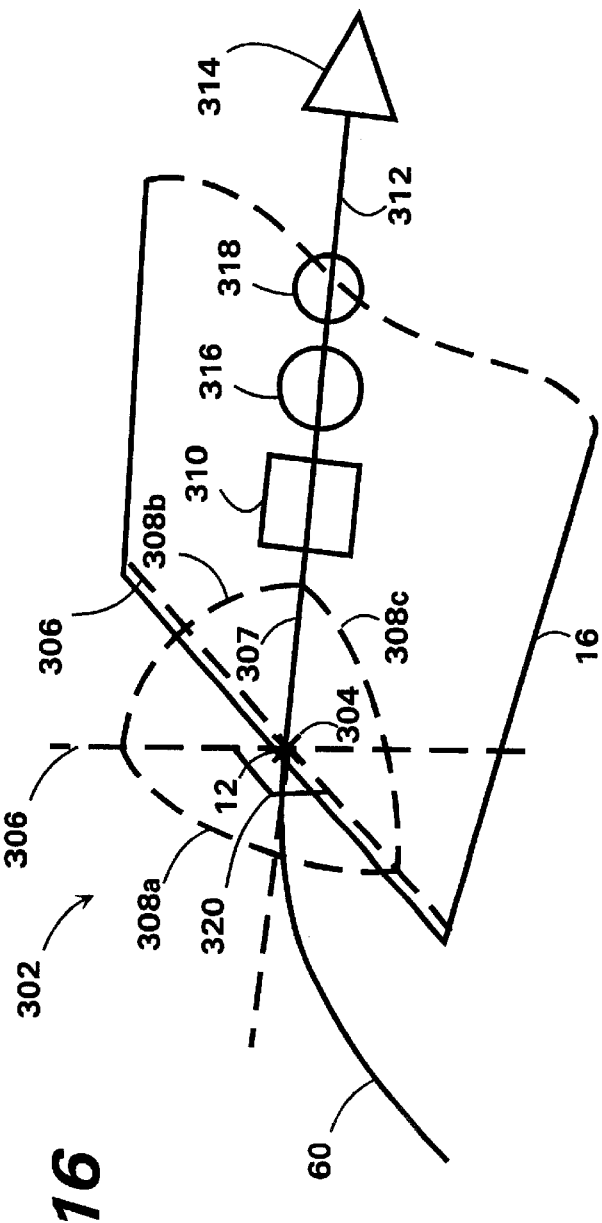

FIGS. 15 and 16 are perspective views of constraint interpolate direction and geometry tools.

DESCRIPTION

Figure 1:
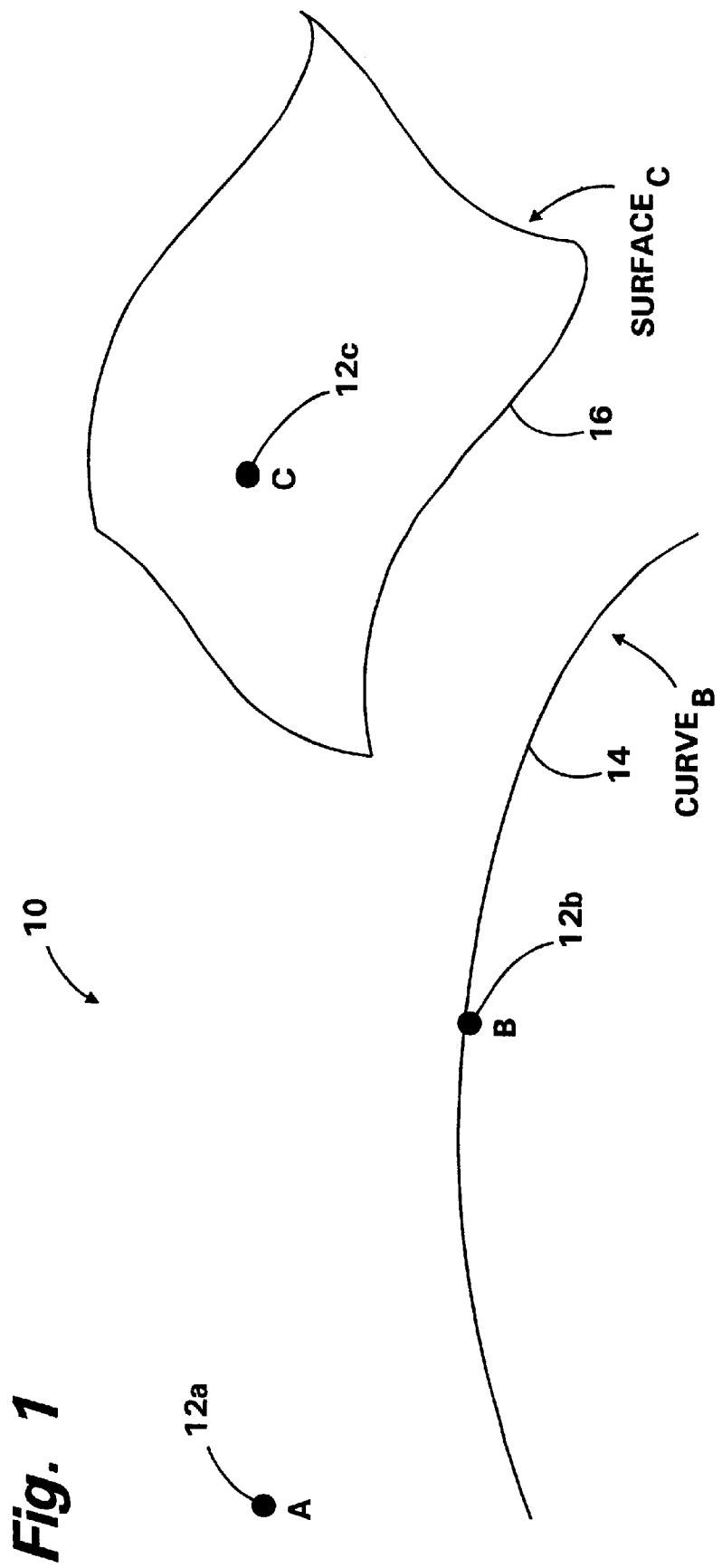
FIG. 1 is a perspective view of a blended curve configuration having constraint points.

Referring to FIG. 1, a blended curve configuration 10 begins with an ordered set of two or more constraint points 12 (e.g., constraint points 12a, 12b, and 12c) located in space (usually 3-space, but this can be generalized to other dimensional spaces). Constraint points 12 can be located in free space (as point 12a), on a curve (as point 12b on curve$_B$ 14), or on a surface (as point 12c on surfaces$_C$ 16). Constraint points 12 define intersection points for the blended curve.

Figure 2:
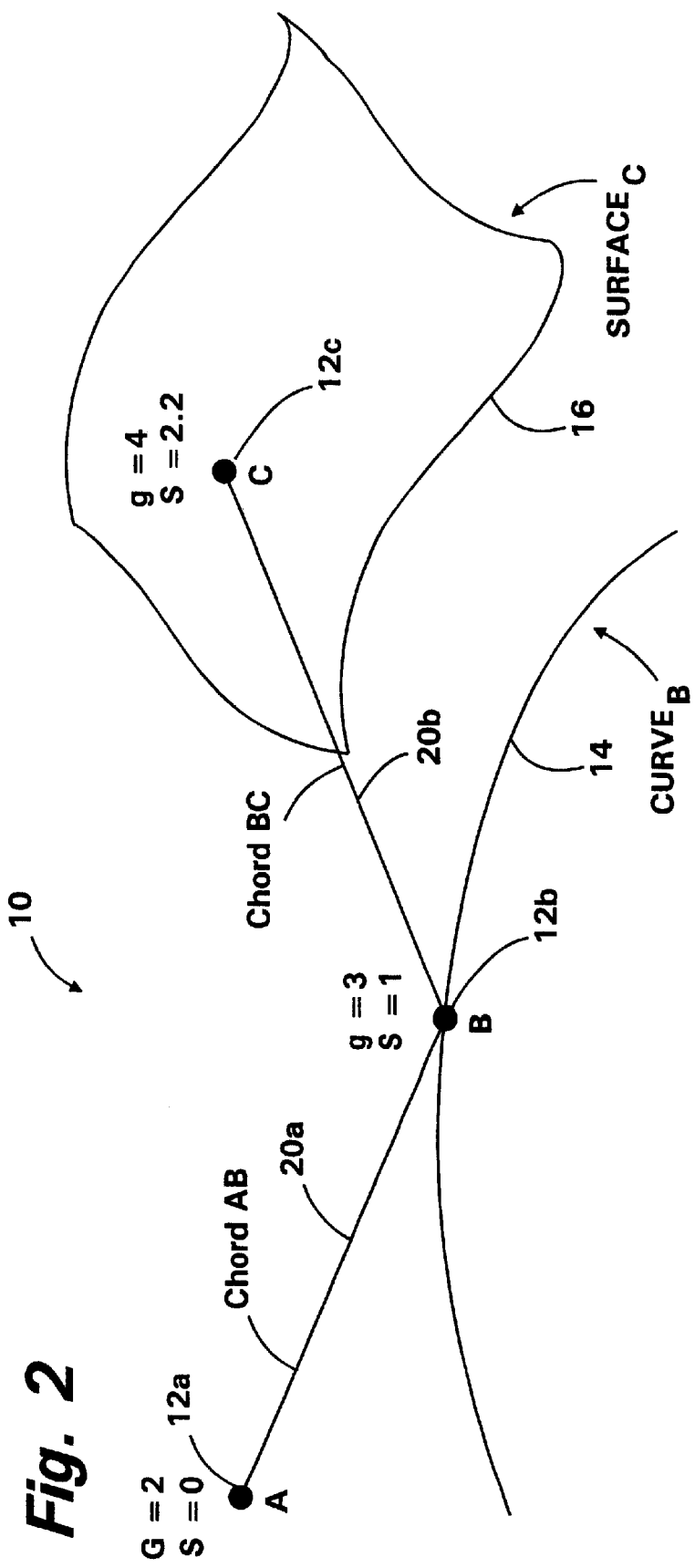
FIG. 2 is a perspective view of a parameterized set of constraint points of a blended curve configuration having constraint points.
Figure 3A:
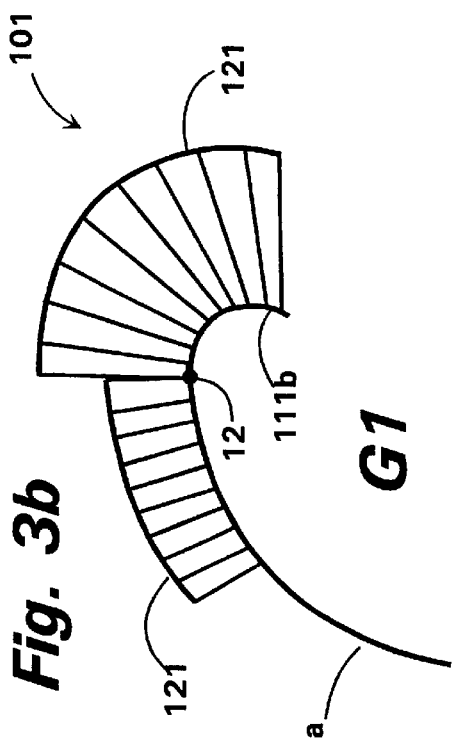
FIGS. 3a through 3d are schematic representations of geometric continuity levels.
Figure 3B:
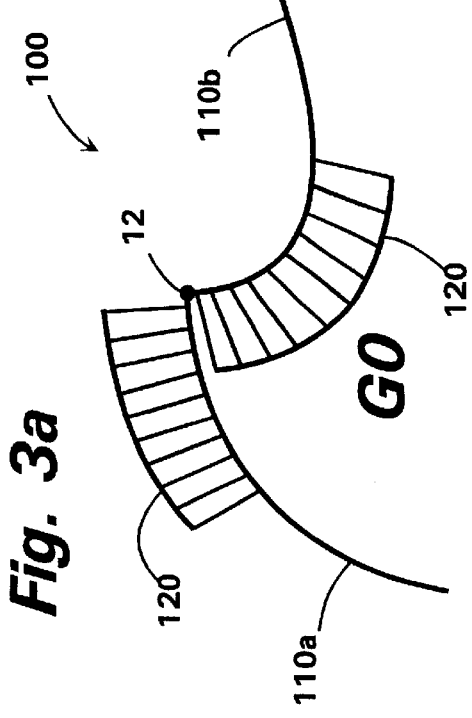
Figure 3C:
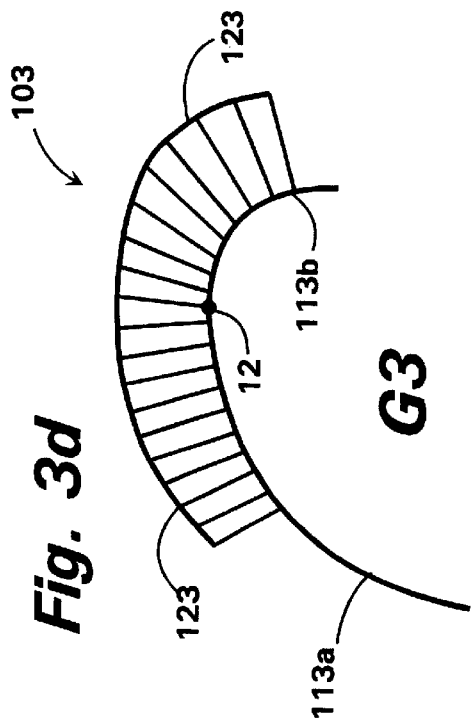
Figure 3D:
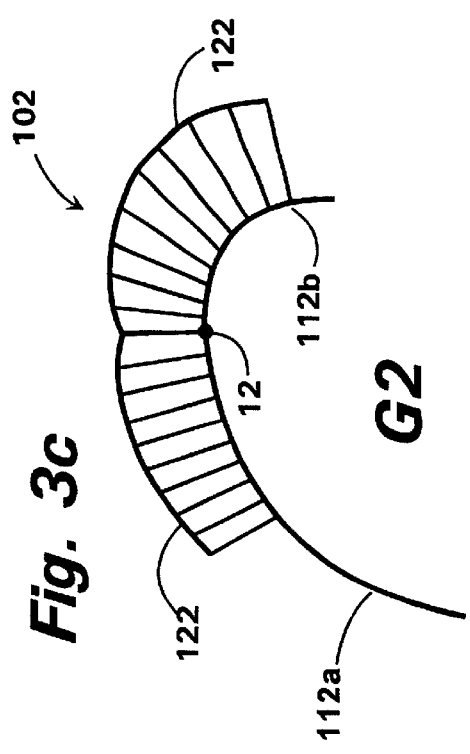

Referring to FIG. 2, the blended curve procedure parameterizes the ordered set of constraint points 12, generally in the order in which constraint points 12 are selected by the user, e.g., first point 12a, next point 12b, lastly point 12c, although other orders (and selective re-orderings) are possible. Typically, a shortest distance is calculated between constraint points, and the constraint points are thereby mathematically coupled together, typically in an open polygon 20 having a maximum length S. The length along the polygon determines an arbitrary parameterization for the to-be-constructed blended curve. In this example, point 12a starts at parameter s=0, point 12b happens to be at parameter s=1, and point 12c is at the maximum parameter s=2.2. The constraint points are joined by chords AB 20a (of length 1) and BC 20b (of length 1.2). Any monotonic parameterization can be used: instead of chord-length parameterization (as here), the system can implement uniform parameterization between constraint points (that is, each chord is defined as equal parameter length regardless of free-space length), or both, or any other conventional method.

The user can also specify an arbitrary degree of geometric continuity at each constraint point. The mathematical basis of geometric continuity is explained in "Geometric Continuity" by John A. Gregory, found in *Mathematical Methods in Computer Aided Geometric Design,* Lynne and Schumaker, eds., Academic Press, Boston, 1989, pp. 353–371, incorporated by reference. Geometric continuity (sometimes called visual continuity) describes how closely parametric curves match at adjacent points. The essence of geometric continuity of degree c at a point is that, within a re-parameterization of one curve for the other, the parametric polynomial functions for the two curves have the same derivatives of degrees 0 through c at that point.

Referring to FIGS. 3a through 3d, graphs 100 through 103 illustrate geometric continuity of degrees 0 through 3 (expressed as G0, G1, G2, etc., or $G^0$, $G^1$, $G^2$, etc.). Curvature is illustrated by respective curvature plots 120 through 123. Graph 100 illustrates $G^0$, or positional continuity: joined curves 110a and 110b (or a curve and a point) have positional continuity at point 12 if they merely share the same location at the point. Graph 101 illustrates $G^1$ or tangential continuity: joined curves 111a and 111b show continuously varying tangents at all points, but curvature plot 121 reveals a sharp discontinuity at point 12.

Graph 102 illustrates $G^2$ or curvature continuity: joined curves 112a and 112b show continuously varying curvature (curvature plot 122 is not discontinuous at point 12), and smoothly varying tangents at all points, yet curvature plot 122 has a corner at point 12. Graph 103 illustrates $G^3$ or continuously varying rate of change of curvature (or curvature acceleration) continuity: i.e., the curvature plot at the joint of curves 113a and 113b has a continuous tangent. Geometric continuity can be generalized for even higher degrees of continuity. Throughout the blended curve generation procedures, geometric continuity conditions are specified at constraint points where the blended curve joins to and is co-located with an underlying geometry (e.g., point, curve, surface, or point cloud).

The user can specify a variety of conditions that a blended curve must satisfy at each ordered point. Referring to FIG. 4, condition 1, or "point" type, is simply that the curve pass through the point, or have $G^0$ continuity. Condition 2, or "point with direction" type, is that the curve pass through the point and be parallel to a specified direction (i.e., $G^1$ continuity with a point and an arbitrarily specified tangent). Constraint point 12a has a specified direction vector 30a, requiring the eventual blended curve to have point-with-direction-type continuity at that point. If constraint point 12a had no direction vector, it would merely require point-type continuity.

Condition 3, or "curve(t, c)" type, requires that the curve pass through and be $G^c$ continuous (geometrically continuous to order C) to a specified curve of parameter t. That is, if one were to break off one of the curves (e.g., the blended curve) at the curves' intersection point, and substitute (for the broken-off half) the corresponding half of the other curve (e.g., the specified constraint curve of parameter t), the resulting, composite, curve would be $G^c$ continuous. As an example, constraint point 12b requires curve(t, c)-type continuity with curve 14. The order of geometric continuity c can be arbitrarily specified but will at least be 0 (i.e., point continuity to the curve). A direction vector 30b can also be specified for constraint points attached to curves, as explained further below.

Condition 4, or "surface(uv, c, type, direction)" type, requires that the curve pass through and be $G^c$ continuous with a specified surface specified by parameters u and v. Constraint point 12c having direction vector 30c terminates in surface 16. The blended curve to be generated will have the specified degree of continuity with surface 16, which means that the generated blended curve will be continuous with a "selection curve" located within surface 16. There are a number of ways that a representative selection curve along surface 16 can be selected. Surface-type condition 4 provides two principal types of curve selection: section and parametric.

Figure 5A:
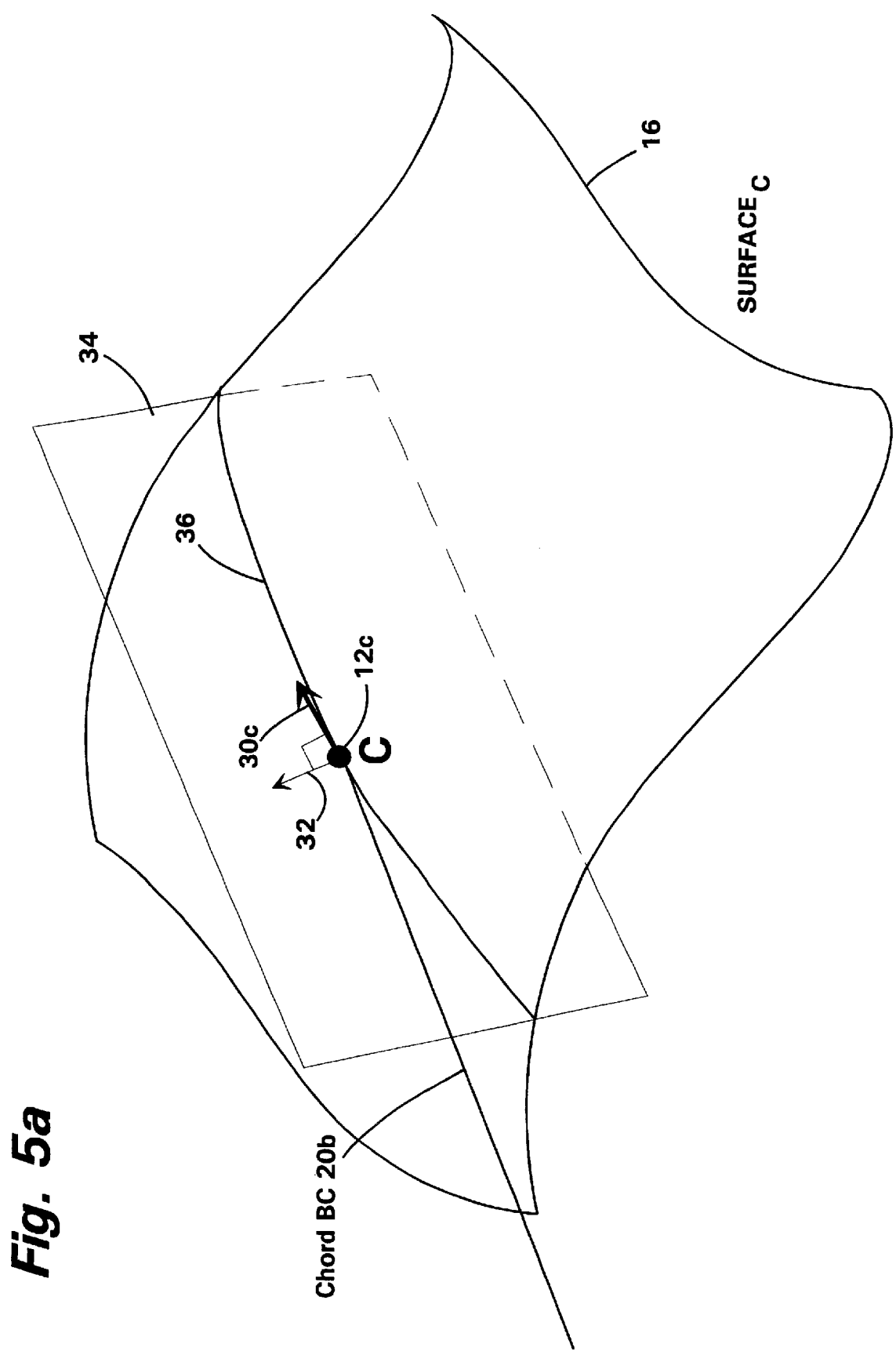
FIG. 5a is a perspective view of a section-type surface curve selection.

Referring to FIG. 5a, in section-type curve selection for surface 16, a sectioning plane 34 is calculated to contain the direction vector 30c of constraint point 12c and a normal 32 to surface 16 at constraint point 12c. Sectioning plane 34 cuts through surface 16 along section curve 36. The to-be-generated blended curve must then satisfy the specified geometric continuity constraint with section curve 36 extending from constraint point 12c. In essence, section curve 36 is substituted for surface 16 in all further calculations to generate the blended curve.

Figure 5B:
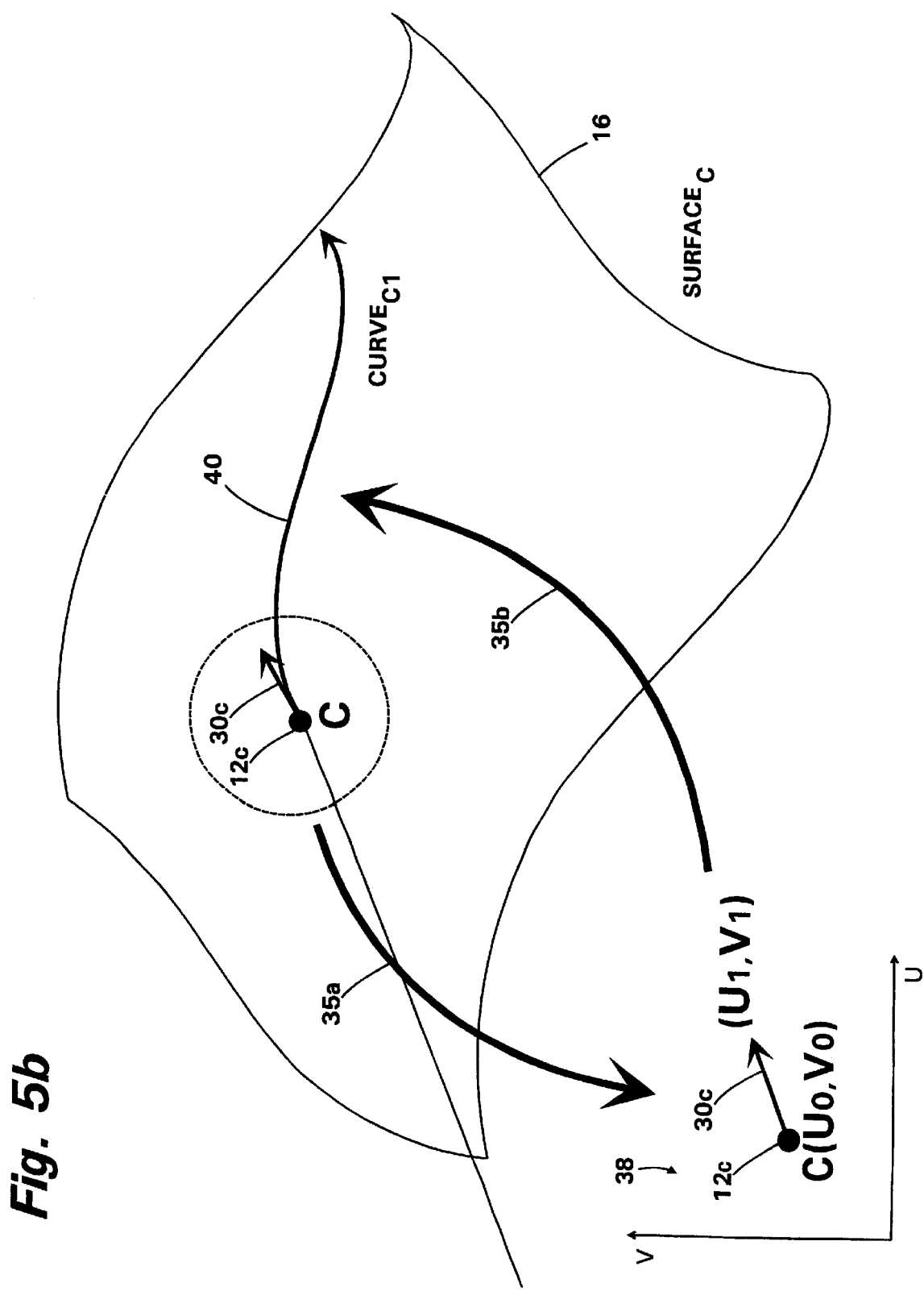
FIG. 5b is a perspective view of a parameter-type surface curve selection.

Parametric-type curve selection is an alternative method of determining the constraint curve for replacing surface 16. Referring to FIG. 5b, parametric-type curve selection parametrically transforms (step 35a) the direction vector 30c (extending away from constraint point 12c) from 3-space to the u-v parametric space 40 for surface 16. In u-v parametric space 40, direction vector 30c extends from constraint point 12c at $U_0, V_0$ to $U_1, V_1$. The line from these two parametric points forms a straight line in parameter space that, parametrically transformed (step 35b) back into 3-space, describes parametric curve 40. Parametric curve 40 is then used to substitute for surface 16 in all further calculations to generate the blended curve. Other types of selection curve calculation are possible.

Condition 5, or "surface(uv, c, type=tangent)" type, is a variant of condition 4, but where no direction is specified in advance for the selection curve that will be substituted for surface 16—constraint point 12c merely resides on surface 16. A curve with a particular direction will be generated in a second stage of the blended curve procedures, as described below, and then substituted for the surface. This allows a user to select a point on surface 16 and allow the blended curve process to generate its own selection curve within the surface to use for continuity purposes.

Figure 6:
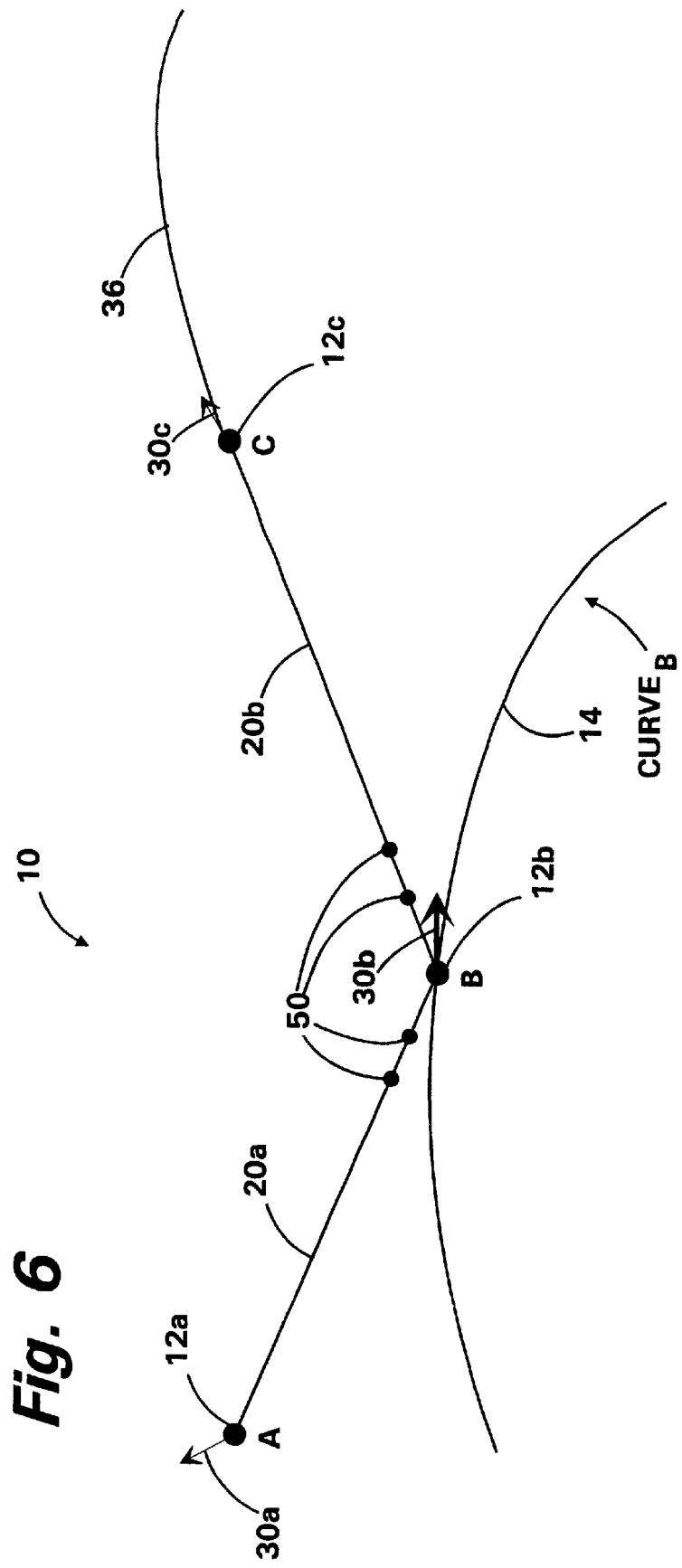
FIG. 6 is a perspective view of a blended curve configuration reduced to a collection of constraint points and curves.

Referring to FIG. 6, all geometric conditions have been placed for blended curve configuration 10: constraint point 12a has a point-with-direction-type condition, using direction 30a, and requires $G^1$ continuity; constraint point 12b has a curve(t, c)-type condition, using direction 30b, for curve 14, and requires $G^3$ continuity; and constraint point 12c has a surface(uv, c, section, direction)-type condition, using section-curve 36 that has been substituted for original surface 16, and requires $G^4$ continuity. In this way, selection curves are substituted for all surfaces(except for surfaces being used for condition 5, that is, surface(uv, c, type= tangent)-type conditions where the selection will be selected during later procedures). In general, the blended curve generation procedures operate upon constraint points and curves.

Figure 7:
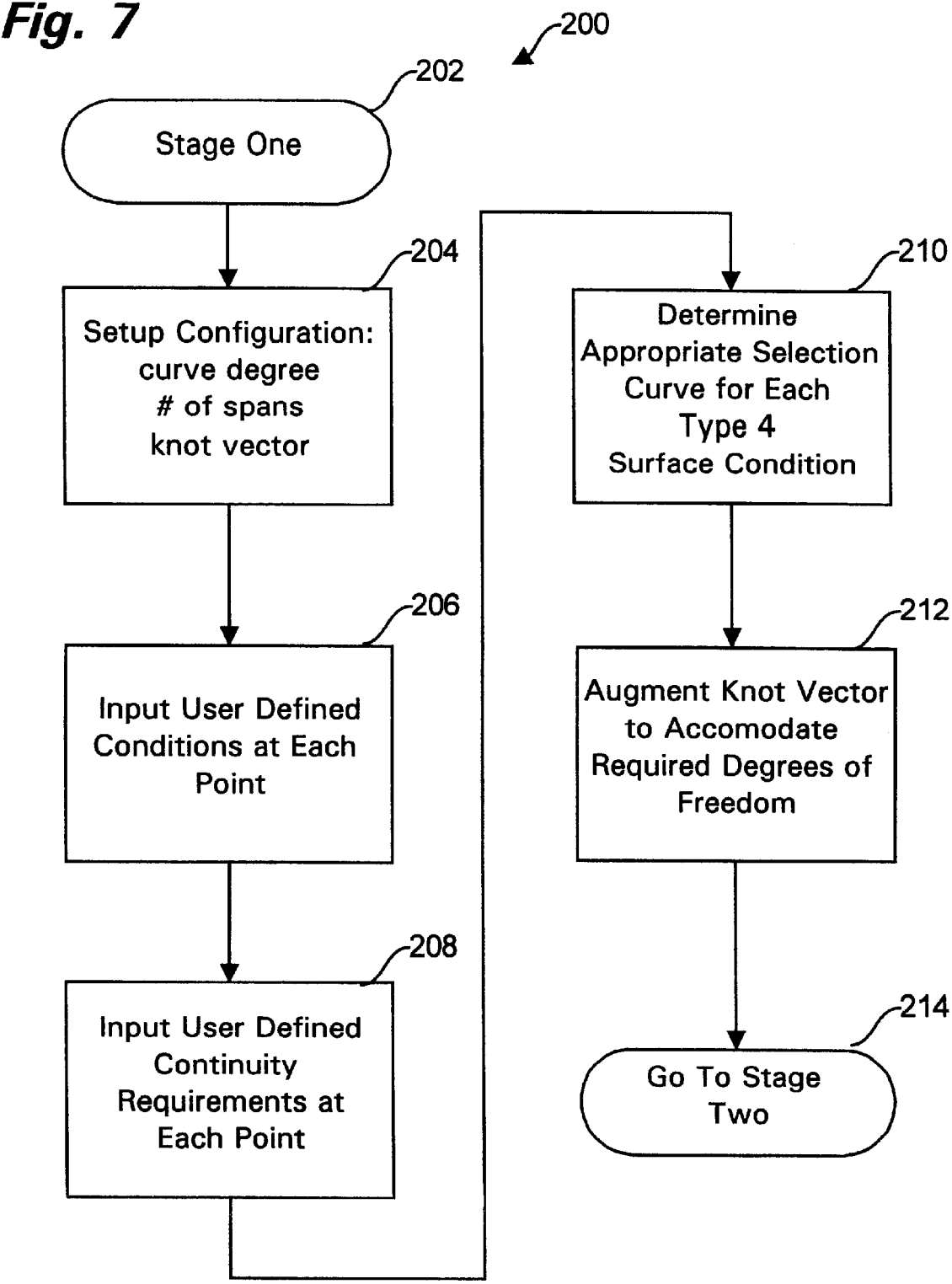
FIG. 7 is a flowchart of Stage One of a blended curve generation procedure.
Figure 8:
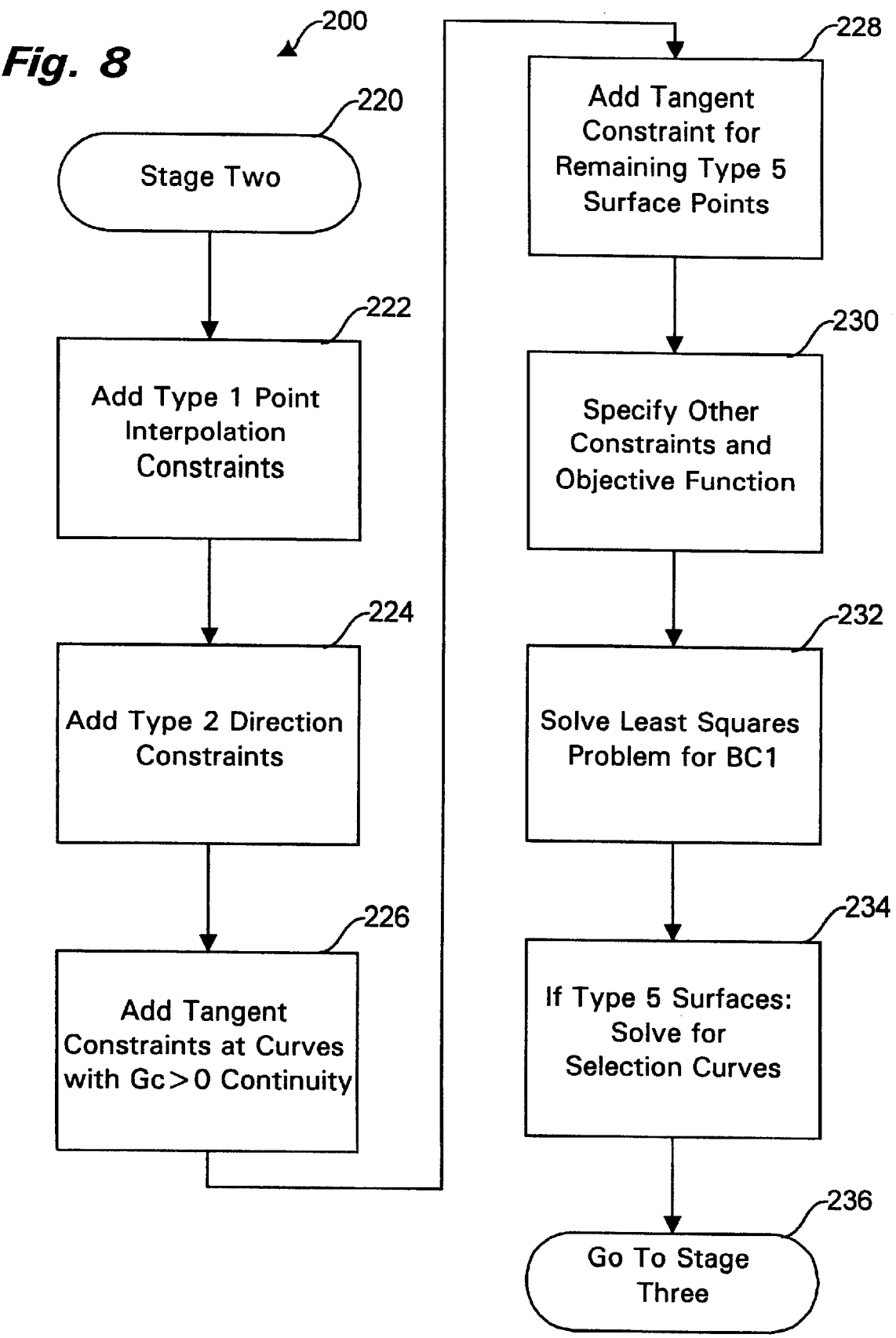
FIG. 8 is a flowchart of Stage Two of a blended curve generation procedure.
Figure 9:
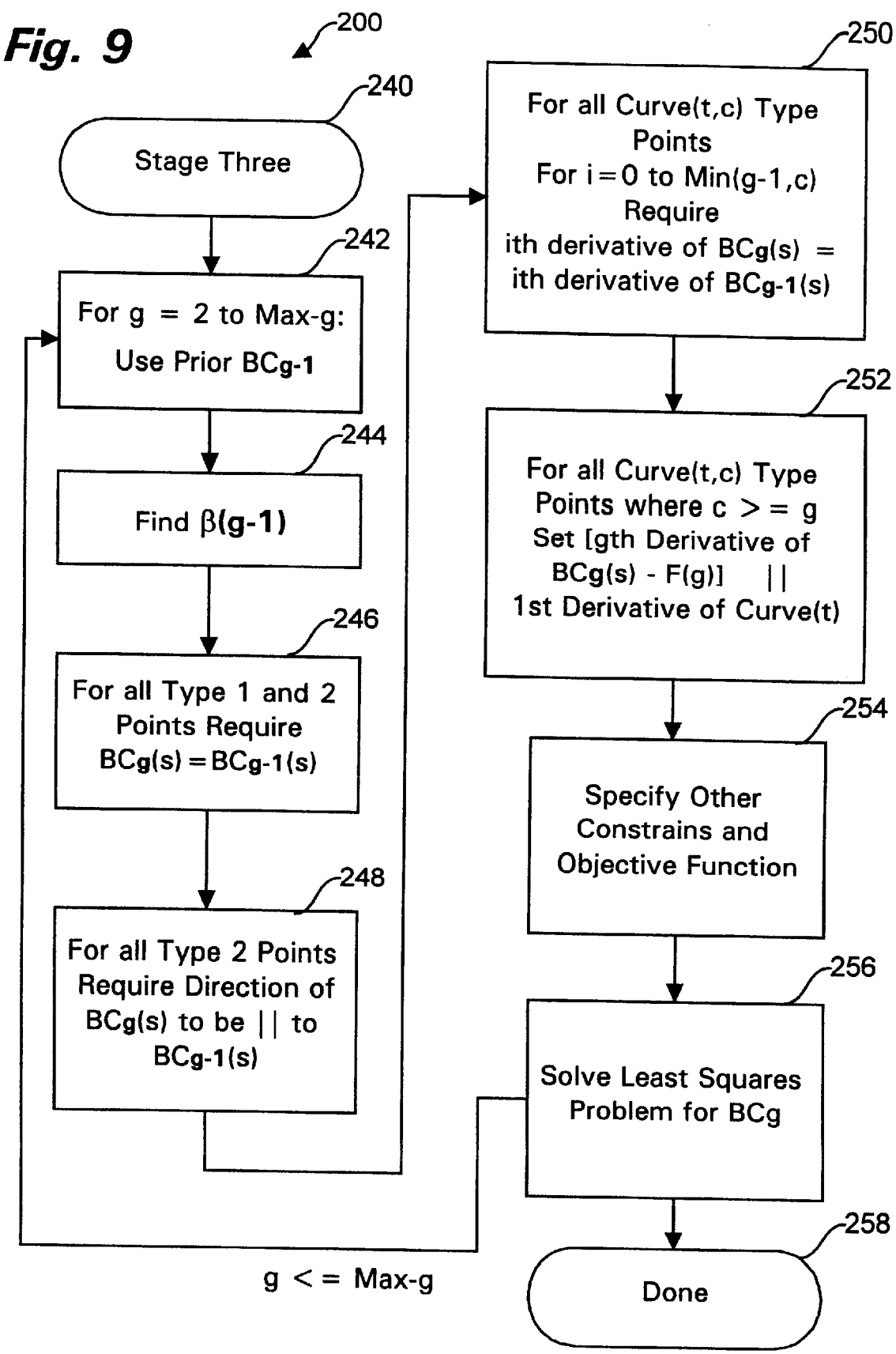
FIG. 9 is a flowchart of Stage Three of a blended curve generation procedure.

Referring to FIG. 7, a blended curve generation procedure 200 begins with Stage One (step 202). As discussed above, an initial setup configuration of the blended curve problem is created (step 204). The overall polynomial degree of the blended curve to be produced (e.g., degrees 1, 2, 3, 5, 7 and so on) can be set, either by the user through a dialog box, or preset by a computer modeling system. However, in general, the degree of the blended curve must be at least equal to the highest geometric continuity order set for any constraint point in the problem (defined below as "Max–g"). The set of constraint points 12 is added, either one-by-one from user input, or collectively from another source, such as a computer file. The number of spans 20 is calculated, the spans are parameterized, and the vector of knots (initially, the locations in parameter-space of constraint points 12) is formed.

The user next defines each type of condition for each constraint point 12 (step 206). That is, conditions 1 through 5 can be specified for each applicable point. Certain conditions can only apply if the constraint point 12 resides on a curve (condition 3) or on a surface (conditions 4 and 5). Point and point-with-direction conditions (conditions 1 and 2) can apply to any constraint point 12. For constraint points 12 having conditions 3 through 5, the user can also specify the geometric continuity c to be maintained by the generated blended curve through each point (step 208). That is, geometric continuity at a curve-type or surface-type point can be anything from simple positional continuity $G^0$ up to a consistent rate of change of the rate of change of curvature continuity $G^4$ (or even higher, if provided for).

Next, blended curve generation procedure 200 determines each appropriate selection curve for each constraint surface 16 (step 210). As noted above, the selection curve can be a section-type selection curve 36 (as in FIG. 5a), or a parameter-type selection curve 40 (as in FIG. 5b).

Referring to FIG. 6, the knot vector is then augmented with additional knots 50 along the polygon of chords 20 connecting constraint points 12 (step 212 of FIG. 7). One additional knot is needed for each additional order of geometric continuity required at a given constraint point 12, in order to provide enough degrees of freedom for each stage of the least squares approximation algorithm that will generate the blended curve. For example, if constraint point 12b is required to be $G^4$ continuous, four additional knots 50 should be added in the vicinity of the corresponding constraint point 12b. In general, the degree of the blended curve also must be at least equal to the maximum continuity order specified for any constraint point.

At this point, initial setup Stage One of the blended curve procedure 200 is complete, and blended curve generation procedure 200 advances (step 214) to Stage Two.

Stage Two (step 220) sets up and solves a first set of linear equations using conventional least squares procedures to generate a first-pass blended curve or $BC_1$. First, type 1 point interpolation constraint equations are generated for each constraint point requiring the generated blended curve BC to pass through all type 1 and higher constraint points (step 222).

Second, for each specified direction vector 30 at applicable constraint points 12, type 2 direction constraint equations are constructed, requiring that the generated blended curve BC be parallel to the direction vectors at each such constraint point (step 224).

Similarly, for each constraint point of curve-type having geometric continuity c>0, a tangent constraint is constructed to ensure that the generated blended curve BC is tangent to the curve at the constraint point (enforcing $G^1$ continuity) (step 226). A simple tangency requirement can be set by two linear equations:

$$BC'(s) \cdot t_1 = 0$$
$$BC'(s) \cdot t_2 = 0 \qquad (1)$$

where $t_1$, and $t_2$ are orthonormal vectors to the tangent vector at point BC(s). These "hard" linear constraints are then added to the linear equation set.

Also, a similar tangent constraint is constructed for each constraint point with a type 5 surface (uv, c, type: tangent) condition (step 228). Such constraints can be expressed as equations of the following general type:

$$BC'(s) \mathrel{I9} N = 0 \qquad (2)$$

where N is the normal to the surface. Such constraints require the blended curve to be tangent to the surface at the constraint point, but is otherwise allowed to point in any direction during the first least squares approximation procedure.

Any other constraints that are useful are then added to the collection of linear equations. Also, an objective function, which is important for the proper operation of the least squares procedures, is formed and added to the equations (step 230). The objective function can be any of a number of functions of the blended curve variables. In one example, the blended curve is a non-uniform rational b-spline (NURB), and its control vertices function as its free variables. One useful objective function minimizes the first derivative of the generated blended curve over its parameter:

$$F_{obj} = \sum_{i=0}^{n} \frac{|BC'(iS/n)|^2}{n} \quad (3)$$

where S is the total parameter length of the blended curve BC, and equation (3) performs a simple estimated integral along that length. Equation (3) tends to minimize the first derivative of the blended curve and during the least squares blended curve generation procedure tends to yield a "taut" and "snappy" blended curve that: (a) passes through all constraint points, (b) obeys all geometric continuity requirements, and (c) yields often highly aesthetic results (that is, very smooth curves useful for applications modeling physical objects having, e.g., aesthetically pleasing light reflection properties, such as automobile computer aided design). It should be noted, though, that one feature of the blended curve procedure is to match, at each constraint point, the specified order of geometric continuity with the underlying geometry. If that geometry is not inherently smooth, requiring a high geometric continuity between the generated blended curve and the underlying constraint geometry will result in a blended curve that conforms to that lack of smoothness.

The objective function can also be the same as equation (3) but use BC" for BC'. Several such objective functions can also be added together to yield a new objective function that tends to produce blended curves having various properties.

In general, objective functions may have the form of $$F_{obj} = \Sigma w_i \cdot (L_i + C_i)^2 \quad (4)$$

where $L_i$ is a linear combination of the variables of the blended curve function, $C_i$ is a constant, and $w_i$ is a non-negative weight. The objective function serves to "soak up" excess degrees of freedom from the system of linear equations being minimized and urge the calculated blended curve towards desirable properties.

Once the objective function is added, the least squares problem is solved, using any available conventional technique to arrive at values of the control vertices of the first iteration blended curve, or $BC_1$ (step 232). If there are any type 5 surfaces in the blended curve configuration, $BC_1$ is then used to calculate a selection curve for each such surface (step 234). This is accomplished by evaluating the direction of the first blended curve $BC_1$ at each constraint point 12 having a type 5 surface condition, and then finding either a section curve formed by the plane in the direction of $BC_1$ at that point (as in FIG. 5a and the accompanying text), or by finding the equivalent parametric line formed by the direction of $BC_1$ at that point and deriving the 3-space correlated selection curve along the surface corresponding to that line in parameter space (as in FIG. 5b and the accompanying text). Either way, once a selection curve has been chosen, it replaces its corresponding type 5 surface for purposes of the blended curve calculations. Blended curve generation procedure 200 then passes (step 236) to Stage Three.

Stage Three (step 240) iteratively solves least squares problems in order to formulate a blended curve having progressively higher orders of geometric continuity at applicable constraint points 12. Stage Three's iteration runs from geometric continuity order g=2 to the maximum g (Max-g) found in any constraint anywhere in the system of constraint points 12 (e.g., g=4) (step 242). In step 242, during each iteration, an important side variable $\beta_{g-1}$ to the least squares minimization constraints is calculated. It has been demonstrated (see the Gregory article above, at p. 356) that two curves p and q demonstrate geometric continuity to an order k at a point if transposed vectors of the first k derivatives of the curves are related as:

$$[q(c),q'(c),q''(c) \ldots q^{(k)}(c)]^T = A[p(c),p'(c),p''(c) \ldots p^{(k)}(c)]^T \quad (5)$$

where A is a connection matrix of the form (shown for k=3):

$$A = \begin{bmatrix} 1 & & & \\ 0 & \beta_1 & & \\ 0 & \beta_2 & \beta_1^2 & \\ 0 & \beta_3 & 3\beta_1\beta_2 & \beta_1^3 \end{bmatrix} \quad (6)$$

and where $\beta_i$ can generally be calculated as a derivative of the re-parameterization function between the two curves p and q. A is extendable to higher orders of continuity g: its important feature, as shown below, is that A's second column remains linear in $\beta_i$.

In the blended curve generation procedure, the actual re-parameterization function (from which $\beta_i$ can be derived) between the two curves need never itself be calculated; each $\beta_i$ is convenient first as simply an unknown variable used in each iteration to link a particular constraint curve function at a constraint point with the to-be-calculated blended curve, and then second as a calculated constant in further iterations.

For example, on the first iteration of Stage Three (where g=2), $\beta_{g-1}$ (or $\beta_1$) is calculated as a constant. Substituting into equation (5) the previously calculated curve $BC_{g-1}(s)$ (i.e., $BC_1(s)$) from Stage One (step 244) as curve "q" and each constraint curve "C(t)" as curve "p" (where s is the blended curve's parameter, and t is the constraint curve's parameter, at their mutual constraint point 12), equation (6) shows $BC_{g-1}$ to be equal to $\beta_1$ multiplied by C'(s), which can be re-expressed as:

$$\beta_1 = \frac{BC'_1(s) \cdot C'(t)}{|C'(t)|^2} \quad (7)$$

$\beta_1$'s readily calculated value is then used to set the condition for the next derivative of the to-be-calculated blended curve $BC_g$ (or $BC_g''$), as set forth below.

In each iteration, the previously calculated blended curve $BC_{g-1}$ is used to set the constraints for the next to-be-calculated blended curve $BC_g$ (step 244). For all type 1 and type 2 points (point and point with direction constraints), the prior blended curve $BC_{g-1}$ fixes the positions of those points for the new blended curve $BC_g$ (step 246), or:

$$BC_g(s) = BC_{g-1}(s) \quad (8)$$

For each type two constraint point (point with direction type points), the derivative of the new blended curve is constrained to be equal to the derivative of the previously calculated blended curve (step 248), or:

$$BC'_g(s) = BC'_{g-1}(s) \quad (9)$$

For all constraint points having type 3 conditions (i.e., curve(t, c)-type), for I=0 to the minimum of g−1 and c (the particular geometric continuity set at a curve(t, c) type constraint point), the ith derivative of $BC_g$ is set equal to the ith derivative of $BC_{g-1}$ (step 250), or:

$$BC_g^{(i)}(s) = BC_{g-1}^{(i)}(s) \tag{10}$$

For all constraint points having curve(t, c)-type continuity, where their predefined order of geometric continuity c is still equal to or greater than g (the current iteration counter), the gth derivative of the new blended curve $BC_g$ (less a constant) is set parallel to the first derivative of the corresponding constraint curve at that constraint point (step 252). This can be shown with reference to equations (5) and (6), where (for g=2):

$$BC''_g(s) = \beta_2 \cdot C(t) + \beta_1^2 \cdot C''(t) \tag{11}$$

Here, $\beta_2$ does not actually need to be calculated in this iteration, but rather functions as a side variable that will be decided and then used during the next iteration (just as $\beta_1$ was already calculated above). Equation (11) shows that the second derivative of $BC_g$ ($BC_g''$) (less a calculable constant that can be generally expressed as F(g,t), and which is at this iteration equal to $\beta_1^2 C''(s)$) is linearly related to the first derivative of C(t)(or C'(t)) by the as-yet-uncalculated $\beta_2$, and the two functions are therefore parallel. Thus, the following condition can be added (step 252) during setup of the current stage iteration:

$$[BC''_2(s) - F(g=2,t)] \| C(t)$$

where $$F(g=2,t) = \beta_1^2 \cdot C''(t) \tag{12}$$

Note that in equation (12), $\beta_2$ is replaced by a requirement that the two expressions be parallel. For the first (g=2) round of Step Three, a similar constraint equation (11) is constructed for each constraint curve C(s) that blended curve BC is required to interpolate having $G^2$ or higher continuity. Equation (12) ensures that blended curve BC(s) is geometric continuous with constraint curve C(t) to degree 2 (degrees 0 and 1 have already been set during Step Two and are now fixed).

Just as in Step Two, any other constraints are added, and the objective function is constructed and added as well (step 254). Finally, the least squares problem is solved for this set of linear equations, deciding values for the control vertices (free variables) of the latest blended curve $BC_g$.

Stage Three is repeated for each g from 2 to Max-g (step 242). Only a few differences occur during each round. First, the next $\beta_g$ (for the next round, $\beta_2$) is calculated (step 244) using equation (11) and the last calculated $BC_{g-1}$. Second, that new $\beta_g$ is used to prepare a new F(g,t) for a similar constraint as that given by equation (12), which can be expressed generally as:

$$[BC_g^{(g)}(s) - F(g,t)] \| C(t) \tag{13}$$

where F(g,t) can be derived from equations (5) and (6) and $BC_g^{(g)}(s)$ is the gth derivative of the to-be-calculated blended curve $BC_g(s)$. For g=3, F(3,t) is given by:

$$F(g=3,t) = 3\beta_1 \beta_2 \cdot C''(t) + \beta_1^3 \cdot C'''(t) \tag{14}$$

In general, F is given b $$F(g,t) = \sum_{j=2}^{g} a(g,j) \cdot C^{(j)}(t) \tag{15}$$

where a(g,j) is the (g,j)th element in the connection matrix A. The important aspect of equations (14) and (15) is that for each iteration round g, F(g,t) is simply a function of previously calculated and set βs (here $\beta_1$ and $\beta_2$) and higher derivatives of the constraint curve at the constraint point: all readily calculable. General equation (13), evaluated for each next iteration round g, relates the next highest order derivative of the blended curve $BC_g$ (less constant F(g,t)) to be parallel simply to the first derivative of the constraint curve at each constraint point. This allows us to compute $\beta_g$ for the next stage iterations from $$BC_g^{(g)}(s) - F(g,t) + \beta_g \cdot C'(t) \tag{16}$$

via $$\beta_g = \frac{(BC_g^{(g)}(s) - F(g,t)) \cdot C'(t)}{|C'(t)|^2} \tag{17}$$

Thus, by iteratively solving the least squares problem of Stage Three, the blended curve better and better satisfies all the geometric continuity conditions that the user has set for all constraint points.

Figure 10:
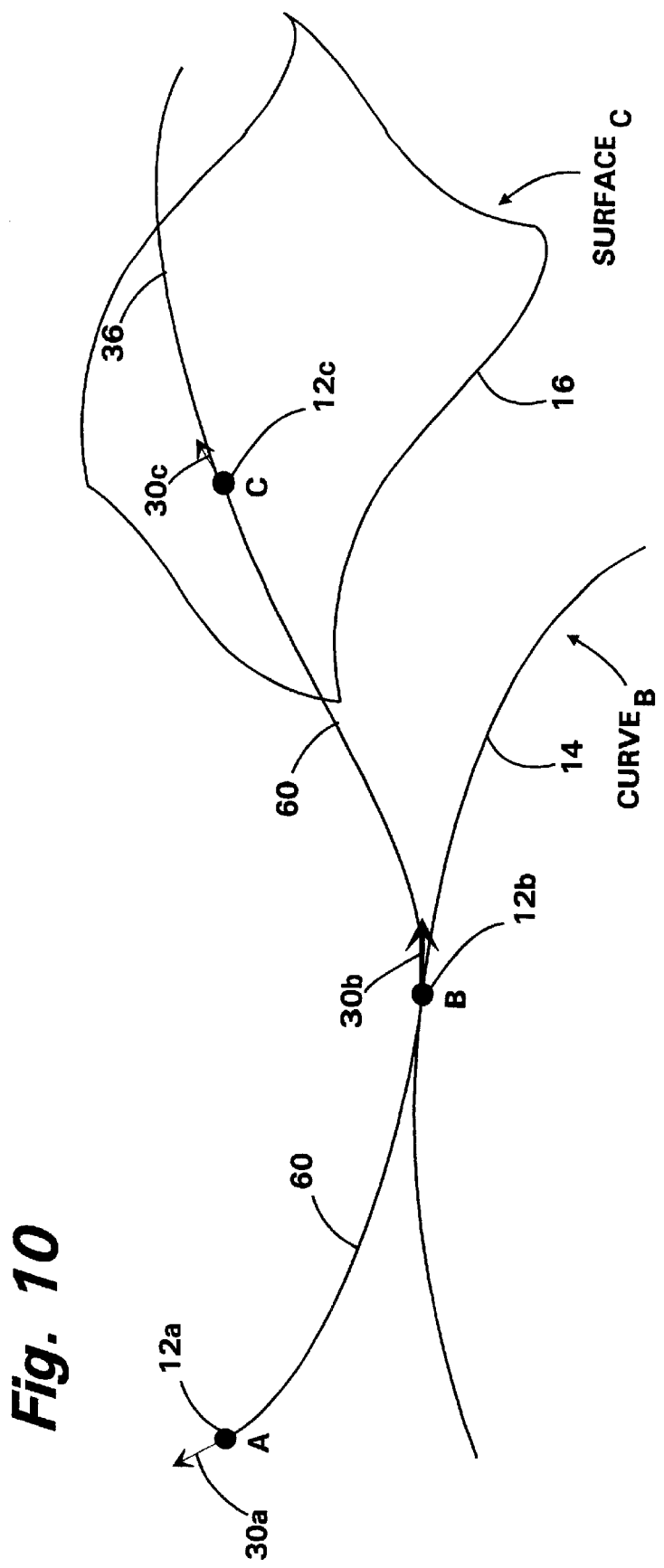
FIG. 10 is a perspective view of a calculated blended curve.

Once all iteration rounds g=2 through Max-g have been completed, Stage Three is finished (step 258) and the final $BC_{Max-g}$ completely satisfies all continuity constraints. Referring to FIG. 10, a final blended curve 60 interpolates constraint points 12a, 12b, and 12c, and satisfies all specified geometric continuity constraints for those points and any respective curves or surfaces (e.g., curve$_B$ 14 and surface$_C$ 16). Once the blended curve has been generated, the constraint points may then serve as control points joined to both the constraint curves and surfaces as well as the blended curve. Moving a constraint point along a constraint curve will (when the procedure iterates and regenerates the blended curve to accommodate that movement) alter the shape of the blended curve BC, while maintaining all geometric continuity constraints.

Referring to FIGS. 11 and 12, constraint points 12a through 12c can function also as useful control points for adjusting the position and properties of the generated blended curve 60. For example, in FIG. 11, constraint point 12b can be moved along curve$_B$ 14 and when blended curve 60 is regenerated, it remains constrained to curve 14 and obeys the same geometric continuity constraints. Similarly, in FIG. 12, point 12c has been moved along surface 16 and blended curve 60 has appropriately regenerated. Constraint points 12 allow convenient and intuitive control over the position and shape of generated blended curves 60, especially since constraint points 12 remain attached to both blended curve 60 and constraint curves and surfaces (as opposed to control vertices which are typically off-curve). A user can place a constraint point on a curve, generate a blended curve, and ensure that the blended curve will retain all specified properties even as the exact position of constraint point 12 on constraint curve 14 is fine-adjusted, or curve 14 or surface 16 are completely moved, as in FIG. 13.

Implementation of other aspects of the invention follows from knowledge of the invention. The invention may be implemented in hardware or software, or a combination of both. Preferably the invention is implemented in one or more computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Referring to FIG. 14, a computer system 200 for generating a blended curve includes a CPU 202, a display 204, a system memory 206, an internal memory device (e.g., hard disk drive) 208, a user input device(s) 210 (e.g., keyboard and mouse), and a removable storage medium 212 (e.g., floppy, tape, or CD-ROM) read by an appropriate drive 214, all coupled by one or more bus lines 216. A blended curve generation program can be stored on a suitable removable storage medium 212, and then introduced to computer system 200 through drive 214 to be either temporarily stored in system memory 206 or permanently stored in internal memory device 208. CPU 202 then uses the introduced blended curve generation program to generate one or more blended curves.

Referring to FIGS. 15 and 16, user interaction tools 300 and 302 may be displayed on display 204 at an active constraint point 12 to allow a user to conveniently set a number of constraint point parameters. In FIG. 15, constraint interpolate direction tool 300 includes a free move handle 304 overlaid on constraint point 12, an axis align handle 306, an axis rotate handle 308 (for three axes: 308 a, 308b, and 308c), a tangent scale handle 310, a constrained move handle 312, and a free rotate handle 314. Constraint interpolate direction tool 300 can be used with both unattached (or free-space) constraint points and constraint points attached to a curve.

Free move handle 304 allows the constraint point to be selected and moved freely with simple conventional mouse selection and movement techniques. A new position can also be keyed in by typing values into a keyboard input device 210. Local specification of how three orthonormal axes are aligned to the direction of the blended curve 60 at the constraint point can be adjusted by selecting and releasing any of the three displayed axes 306 (represented by dotted lines that extend from the center of direction tool 300, and each comprising two sub-axes that extend in opposite directions), and causes the direction indicator 314 to realign to the new axis. Typically, axes 306 attached to a curve are aligned with the curve's tangent, and normal and bi-normal lines (which can be defined from all possible such normal lines). Similarly, the angular direction in 3-space of the direction tool 300 can be altered by clicking and holding on any of the rotation axis 308 to increase or decrease the angle. Or, instead, rotation arc 308 can be selected and an angular value entered through input device 210.

Selecting constrained direction handle 312 can provide a guideline that allows moving constraint point 12 along the specified direction. Selecting free rotate handle 314 (shown as an arrow head) allows the direction of constraint point 12 to be altered freely, or to snap the direction to another geometry (such as another curve or surface), or to an intersection of grids.

The tangent scale handle 310 allows adjustment of the tangent magnitude of the constraint point 12. Dragging tangent scale handle 310 left or right (or up or down) interactively increases or decreases the tangent scale. As with any of the other conditions, the tangent scale value can be keyed in as well. A larger tangent scale value increases the flatness of the curve at the constraint point.

Referring to FIG. 16, constraint interpolate geometry tool 302 is very similar to (and shares many of the same like-numbered parts as) constraint interpolate direction tool 300. Constraint interpolate geometry tool 302 allows higher levels of constraints to be set relative to the particular geometry (e.g., curve or surface) which contains constraint point 12. Also, while the constraint interpolate direction tool 300 allows the direction 30 of a constraint point to be freely selected, the direction of constraint interpolate geometry tool 302 is typically set relative to a locally defined coordinate frame (tangent, surface normal, bi-normal) so that this relative direction remains the same (based upon the local coordinate frame of the geometry to which the constraint point is attached) as the constraint point moves along the geometry. For example, if the direction is set at 45° from tangent, it will remain so as the constraint point moves to different positions along the surface that have different local tangents.

Free move handle 304 operates similar to that in direction tool 300, except that movement of constraint point 12 is constrained to the geometry with which it is connected (a point on a curve can move along the curve's entire length; a point on a surface is constrained to the surface). Axis align and rotate handles 306 and 308 allow alignment of the constraint direction with the major directions similar to the direction tool 300: but, with constraint surfaces, two axes 306 automatically lie within the tangent plane at constraint point 12, with a third axis 306 lying along the surface normal. Moving free rotate handle 314 allows a user to interactively change direction of constraint point 12, whose direction is generally limited to directions allowed by the constraint curve or surface to which the constraint point is attached.

Scale of curvature handle (a small circle) 316 appears if the geometric continuity of constraint point 12 is set to G2 or higher: dragging scale of curvature handle 316 left or right (or up or down) from constraint point 12 increases or decreases required curvature. Similarly, scale of rate of curvature handle (a second smaller circle) 318 appears if the geometric continuity of constraint point 12 is set to G3 or higher: dragging scale of rate of curvature handle 316 left or right (or up or down) from constraint point 12 increases or decreases the required rate of change of curvature.

Perpendicular indicator 320 is displayed whenever a constraint point 12 is connected to a constraint surface and, additionally, the constraint direction 30 (represented by indicator 314) lies in the tangent plane to the constraint surface 16 at that point. The perpendicular indicator 320 indicates that the constraint direction is perpendicular to the surface normal at point 12. Axis align and rotate handles 306 and 308 can be adjusted until the perpendicular indicator 320 appears, indicating that the to-be-generated blend curve 60 is attached to the geometry perpendicular to its surface normal. Once aligned such that the constraint point 12 is "perpendicular" (that is, its direction is tangent to the constraint geometry), in this fashion, the condition can be maintained regardless of how constraint point 12 is later moved along the curve or surface, easily maintaining geometric continuity requirements during such movement.

Other embodiments are within the scope of the claims. For example, constraint points can also be added to a defined "surface" or other location on or in a "cloud of points." The constructed blended curve can then be attached to the cloud of points' constraint point. Any number of successive geometric continuity constraints can be specified at each constraint point. Any number of constraint points can be used to construct a blended curve. Each of the constraint points can remain unattached in free space, or can be attached to a constraint curve, surface, or cloud of points. Any formalism for defining curves can be used to define and calculate the blended curve. A number of different objective functions can be used during the least squares calculations.

What is claimed is:

1. A method of generating a curve through points located in a three-dimensional space that includes one or more underlying geometries, the method comprising:

receiving information defining point positions, each point P constrained to reside on a corresponding underlying geometry;

receiving information defining a geometric continuity condition k(P) of arbitrarily high order m at each of the constraint points, the geometric continuity condition k(P) specifying, at each constraint point P, an arbitrarily high measure of matching in m steps between the curve to be generated and that point's corresponding underlying geometry;

constructing the curve through the constraint points, the constructed curve obeying the respective geometric continuity conditions at the constraint points; and displaying the generated curve.

2. The method of claim 1, in which an underlying geometry comprises a parametrically defined curve or surface.

3. The method of claim 1, in which the underlying geometry comprises a single point.

4. The method of claim 1, in which the underlying geometry comprises a curve.

5. The method of claim 1, in which the underlying geometry comprises a surface.

6. The method of claim 1, in which the constraint points define an ordered set based on an order in which the constraint points are received.

7. The method of claim 1, in which constructing the curve comprises receiving information defining a direction vector for an applicable constraint point.

8. A method of generating a curve through points located in a three-dimensional space that includes one or more underlying geometries, the method comprising:

receiving information defining point positions, each point P constrained to reside on a corresponding underlying geometry; receiving information defining a geometric continuity condition k(P) at each of the constraint points, the geometric continuity condition k(P) specifying, at each constraint point P, an arbitrarily high measure of matching between the curve to be generated and that point's corresponding underlying geometry; and constructing the curve through the constraint points, the constructed curve obeying the respective geometric continuity conditions at the constraint points, wherein a geometric continuity of arbitrarily high order g indicates that, at each constraint point P, and for some re-parameterization of a parametric curve associated with the underlying geometry, each derivative of order 0 through g of the constructed curve equals a derivative of corresponding order of a re-parameterized second parametric curve associated with the underlying geometry, and if the underlying geometry is a surface, the associated parametric curve lies on the surface and passes through the constraint point P.

9. The method of claim 8, in which:

a geometric continuity condition k(P)=0 indicates that the curve to be generated pass through the constraint point;

a geometric continuity condition k(P)=1 indicates that the curve to be generated pass through the constraint point and be tangent to the underlying geometry; and a geometric continuity condition k(P)=g, where g≧2, indicates that the curve to be generated be geometrically continuous to order g with the underlying geometry's associated curve.

10. The method of claim 9, in which constructing the blended curve comprises:

setting an overall polynomial degree of the blended curve to be constructed;

forming a vector of knots, in which a knot corresponds to a location in parameter space of a constraint point;

defining, at each constraint point P, a geometric continuity condition k(P);

determining an appropriate selection curve for each surface underlying geometry, in which the selection curve is located within the surface and at the constraint point residing on the surface; and augmenting the knot vector with additional knots along a span of polygons that connect the constraint points, in order to provide enough degrees of freedom for each stage of the least squares technique that generates the blended curve.

11. The method of claim 10, in which constructing the curve comprises solving a first set of linear equations using conventional least squares techniques to generate a first-pass blended curve.

12. The method of claim 11, in which generating the first-pass blended curve comprises:

generating constraint point interpolation equations through all points;

at each constraint point for which a tangent direction has been specified, requiring tangents of the first-pass blended curve to lie parallel to the direction vectors of the constraint point;

at each underlying geometry corresponding to a curve or surface, requiring the first-pass blended curve to be tangent with the corresponding curve or surface at the constraint point;

forming an objective function that gives the first-pass blended curve desirable properties;

solving a linear least squares problem using a conventional technique to determine values of control vertices that define the first-pass blended curve and to minimize the objective function; and calculating a selection curve for each surface for which k(P)≧2.

13. The method of claim 12, in which the objective function comprises a weighted sum of squared lengths of a first derivative of the first-pass blended curve.

14. The method of claim 12, in which the objective function comprises a weighted sum of squared linear functions, each linear function including a linear combination of control vertices of the blended curve.

15. The method of claim 12, in which the selection curve is calculated from the tangent direction of the first-pass blended curve.

16. The method of claim 15, in which constructing the curve further comprises replacing each underlying geometry that includes a surface for which $k(P) \geq 2$ with the selection curve located within the surface and at the constraint point residing on that surface.

17. The method of claim 16, in which the selection curve comprises a section-type curve that is located along and within a plane intersecting the corresponding underlying geometry, such that a normal to the surface at the constraint point P and the direction vector of the constraint point P is located within the intersecting plane.

18. The method of claim 16, in which the selection curve comprises a parametric-type curve that is formed from a set of transformations of the direction vector, the set of transformations includes:
   transforming the direction vector from the three-dimensional space into a line in a parametric space associated with the surface; and
   transforming the parametric line from the parametric space into a parametric curve in three-dimensional space.

19. The method of claim 16, in which constructing the curve further comprises iterating a sequence that, after a final iteration, generates the curve, the iteration running from geometric continuity g of order 2 to a geometric continuity of order g(max) that is a maximum value from the set of geometric continuity conditions k(P) of all constraint points P forming the generated curve.

20. The method of claim 19, in which an iteration sequence comprises:
   receiving a blended curve $BC_{g-1}$;
   setting constraints for a next blended curve $BC_g$ based on the received blended curve $BC_{g-1}$;
   constructing an objective function;
   solving a linear least squares problem that minimizes the objective function while satisfying the constraints; and
   constructing the next blended curve.

21. The method of claim 20, in which the received blended curve is the first-pass blended curve.

22. The method of claim 21, further comprising receiving constraints that are not based on the received blended curve.

23. The method of claim 20, in which setting constraints for a next blended curve $BC_g$ based on the received blended curve comprises:
   for all constraint points P with geometric continuity condition k(P) and for all i from 0 to a minimum of g and k(P), constraining an ith derivative of the next blended curve $BC^{(i)}_g$ to be equal to an ith derivative of the received blended curve $BC^{(i)}_{g-1}$; and
   for all constraint points P in which $k(P) \geq g$, constraining a gth derivative of the next blended curve $BC_g$ to lie on a line parallel to a first derivative of a constraint curve C at that constraint point P, the constraint curve C corresponding to the underlying geometry at constraint P;
   in which the line parallel to the first derivative is chosen such that if the gth derivative of $BC_g$ lies on this line and the derivatives of order <g are equal to the derivatives of $BC_{g-1}$, then $BC_g$ satisfies a geometric continuity condition of order g at the point P.

24. The method of claim 23, in which the blended curve comprises a nonuniform rational B-spline curve in which its control vertices function as its free variables.

25. The method of claim 23, in which a blended curve comprises an associated parametric representation that is based on the received constraint points.

26. The method of claim 25, in which a constraint curve corresponding to an underlying geometry comprises an associated parametric representation.

27. The method of claim 23, in which all necessary derivatives for the blended curves and the constraint curves may be evaluated.

28. The method of claim 20, in which the equations corresponding to the objective function and the constraints comprise a set of linear equations.

29. The method of claim 28, in which solving a least squares problem comprises using a least squares optimization with linear constraints and standard linear techniques and using control vertices of the blended curve as free variables.

30. The method of claim 19, in which the generated curve completely satisfies all continuity constraints.

31. The method of claim 1, further comprising displaying the generated curve in the three-dimensional space.

32. The method of claim 1, in which the curve is generated through points located in a multidimensional space.

33. The method of claim 1, in which the underlying geometry comprises a cloud of points.

34. A method of generating a nonuniform rational B-spline curve through points P located in a three-dimensional space that includes one or more underlying geometries, the method comprising:
   receiving information defining point positions, each point constrained to reside on a corresponding underlying geometry that has an associated parametric representation and for which all necessary derivatives may be evaluated;
   receiving a value, called k(P), defining a geometric continuity condition at each of the points P, the geometric continuity condition specifying, at each point, an arbitrarily high measure of matching between a curve to be generated and that point's corresponding underlying geometry;
   constructing the curve through the points, the curve obeying the respective geometric continuity conditions at the points, the constructing comprising:
     receiving information defining a direction vector for an applicable constraint point,
     constructing an initial blended curve through the constraint points and satisfying tangency requirements by using conventional least square techniques,
     replacing each underlying geometry that comprises a surface with a selection curve located within the surface and at the constraint point residing on the surface, and iterating a sequence that, after a final iteration, generates the curve, the iteration running from geometric continuity of degree 2 to a geometric continuity of degree g(max) that is a maximum value from the set of geometric continuity conditions k(P) of a1 constraint points P forming the generated curve, the iteration sequence comprising:

receiving a blended curve, setting constraints for a next blended curve which preserve the geometric continuity achieved in the received blended curve and achieve one order higher geometric continuity at all points in which geometric continuity of order k(P) has not been achieved in the received blended curve, constructing an objective function, computing blended curve coefficients by solving a least squares problem specified by the objective function and constraints, and constructing the next blended curve, and after the curve is constructed, displaying the generated curve in the three-dimensional space.

35. A method of generating a curve, comprising:

receiving information defining a geometric continuity condition of arbitrarily high order m for each of one or more constraint points, the geometric continuity condition specifying, at each constraint point, an arbitrarily high measure of matching, in m steps, between the curve to be generated and a corresponding underlying geometry of each point;

constructing the curve through the constraint points; and displaying the generated curve.

* * * * *

UNITED STATES PATENT AND TRADEMARK OFFICE
CERTIFICATE OF CORRECTION

PATENT NO. : 6,268,871 B1
DATED : July 31, 2001
INVENTOR(S) : Richard E. Rice et al.

It is certified that error appears in the above-identified patent and that said Letters Patent is hereby corrected as shown below:

Column 6,
Equation (2), change to -- $BC'(S) \cdot N = 0$ --;

Column 9,
Equation (10), change to -- $BCg^{(i)}(S) = BCg^{(i)}_{-1}(S)$ --;

Column 10,
Line 1, change "b" to -- by --.

Signed and Sealed this

Sixth Day of August, 2002

Attest:

JAMES E. ROGAN
Attesting Officer   Director of the United States Patent and Trademark Office